United States Patent

[11] 3,601,704

[72] Inventor Manfred Seltzer
Bad-Soden, Taunus, Germany
[21] Appl. No. 746,400
[22] Filed July 22, 1968
[45] Patented Aug. 24, 1971
[73] Assignee Eichner Organisation GmbH
Frankfurt on Main, Germany
[32] Priority Aug. 17, 1967
[33] Germany
[31] P 15 49 408.3

[54] ARRANGEMENT FOR GENERATING THE COMPLEMENT OF A NUMBER
4 Claims, 3 Drawing Figs.

[52] U.S. Cl. .......... 328/46, 328/41, 328/48, 328/94
[51] Int. Cl. .......... H03k 21/06
[50] Field of Search .......... 328/41, 42, 46, 48, 94, 206; 307/223, 225, 289, 218

[56] References Cited

UNITED STATES PATENTS 3,343,095 9/1967 Offereins .......... 328/48
3,395,352 7/1968 McCammon .......... 328/46
3,345,521 10/1967 Leenhouts .......... 328/48 X

OTHER REFERENCES

IBM Technical Disclosure Bulletin— Vol. 9, No. 12 May 1967 " Ripple Counter" by Johnson (Copies enclosed) 328–48

*Primary Examiner*—John S. Heyman
*Attorney*—Michael S. Striker

ABSTRACT: In a computing system having a number of flip-flops and output lines connected to only one side of these flip-flops the complement of a number is generated by first resetting all flip-flops, then entering the number whose complement is to be found into said flip-flops, and subsequently switching each of said flip-flops to the opposite stable state, the signals thus appearing on the output lines constituting the 1's complement of the number set into the flip-flops. If four flip-flops are used to constitute a decade digit, and the number is entered in an excess 3 code, then the output lines will carry the 9's complement of the number.

INVENTOR
MANFRED SELZER

BY Michael S. Striker
ATTORNEY

ARRANGEMENT FOR GENERATING THE COMPLEMENT OF A NUMBER

BACKGROUND OF THE INVENTION

This invention relates to an arrangement for furnishing the complement of a number. In particular this arrangement concerns the furnishing of the complement of a number when said number is represented in a binary representation in a digital computer system.

The complement of a number may be defined as the difference between said number and a predetermined constant. For example the 9's complement of a number, or the complement of the number with respect to 9, is the difference between said number and 9. Thus the 9's complement of 5 is 4. In digital computing systems the complement of a number is often used to represent a negative number. The generation of such complements with a minimum of equipment is therefore of primary importance in the development of computing systems.

Often digital computers use a binary representation for a decimal digit. Thus a combination of four flip-flops may be used to represent a decimal digit from 1 to 9 by assigning a predetermined value to each of the flip-flops. For example the values assigned may be 1, 2, 4 and 8. Thus the number 9 would be represented by a SET condition in flip-flops 1 and 8 and a RESET condition in flip-flops 4 and 2. The difficulty here encountered is, that for a decimal system when additions are carried out it is desirable to have an overflow when the number 10 is reached. However a four flip-flop decade will normally overflow when the value 16 is reached. In order to make the overflow conform to the decimal system it is usual to set in two numbers to be added in excess 3 code. The excess 3 code merely consists of adding an additional 3 to each of the numbers to be added. Thus upon addition of two numbers the counter will overflow at the value 16 which, however, actually represents the value 10 since two excess 3's were included in the addition.

When a flip-flop having two outputs is used to represent a binary digit, a first output line may be connected to the first output to furnish the indication of the absence or presence of said binary digit, while the second output line may be used to represent the absence or presence of the complement of said binary digit. However in digital computing systems flip-flops having only one output line are often used. The use of two output lines, one for furnishing the complement of a number on the same output lines normally furnishing said number. This would also result in a saving of space otherwise required for the extra wiring and logic circuitry.

If four flip-flops, respectively having the values, for example, 8, 4, 2 and 1, are used jointly to represent decimal digits the complements of the binary digits representing the decimal digit will yield the 15's complement of the digit. Thus, for a decimal digit 3 flip-flops 8 and 4 will be in the RESET condition, while flip-flops 2 and 1 will be in the SET condition. The complement, as available at the other outputs of the flip-flops will be 8 and 4 in the SET state and 2 and 1 in the RESET state. This represents the number 12 which is the 15's complement of the number 3. If now the excess 3 code is used the highest number that can be set into the flip-flops is actually 12 since:

$$15-3=12$$

Since the number set in is equal to $n$ 3 wherein $n$ is the number whose complement is desired, the number available at the other outputs of the flip-flops will be:

$$12-(n+3) \text{ or } 9-n$$

Thus it is seen that in this particular case the 9's complement will be generated. It is this complement which is generally required in digital computing systems for indicating a negative decimal digit.

SUMMARY OF THE INVENTION

This invention is an arrangement for furnishing the complement of a number. It comprises a plurality of bistable elements, each adapted to signify the presence of a binary digit when in a first stable state and the absence of said digit in a second stable state. Each of said binary digits represents a predetermined value, a number being represented by the sum of the values corresponding to the digits present. Also comprised in the invention are a plurality of output means, each connected to a corresponding bistable element in such a manner that a signal appears in said first stable state. Also, resetting means are supplied for resetting all of said bistable elements to said second stable state. Means are further supplied for setting each of said bistable elements to one of said stable states in such a manner that said sum of values of the digits present corresponds to said given number. Finally, means are provided to switching represent the complement of said given number with respect to the highest number which can be represented by said plurality of bistable elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The preferred embodiment of this invention will now be described in relation to the FIGURES.

Figure 1:
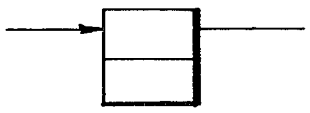
FIG. 1 shows a flip-flop having a RESET input for resetting said flip-flop to the desired bistable state.

FIG. 1 shows a flip-flop having a RESET input adapted to reset said flip-flop to a predetermined stable state.

Figure 2:
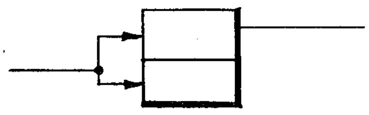
FIG. 2 shows a flip-flop having a trigger input, for switching said flip-flop from either of said stable states to the other.

FIG. 2 shows a flip-flop having a trigger input, its signal on said trigger input causing the flip-flop to change from either stable state to the other.

Figure 3:
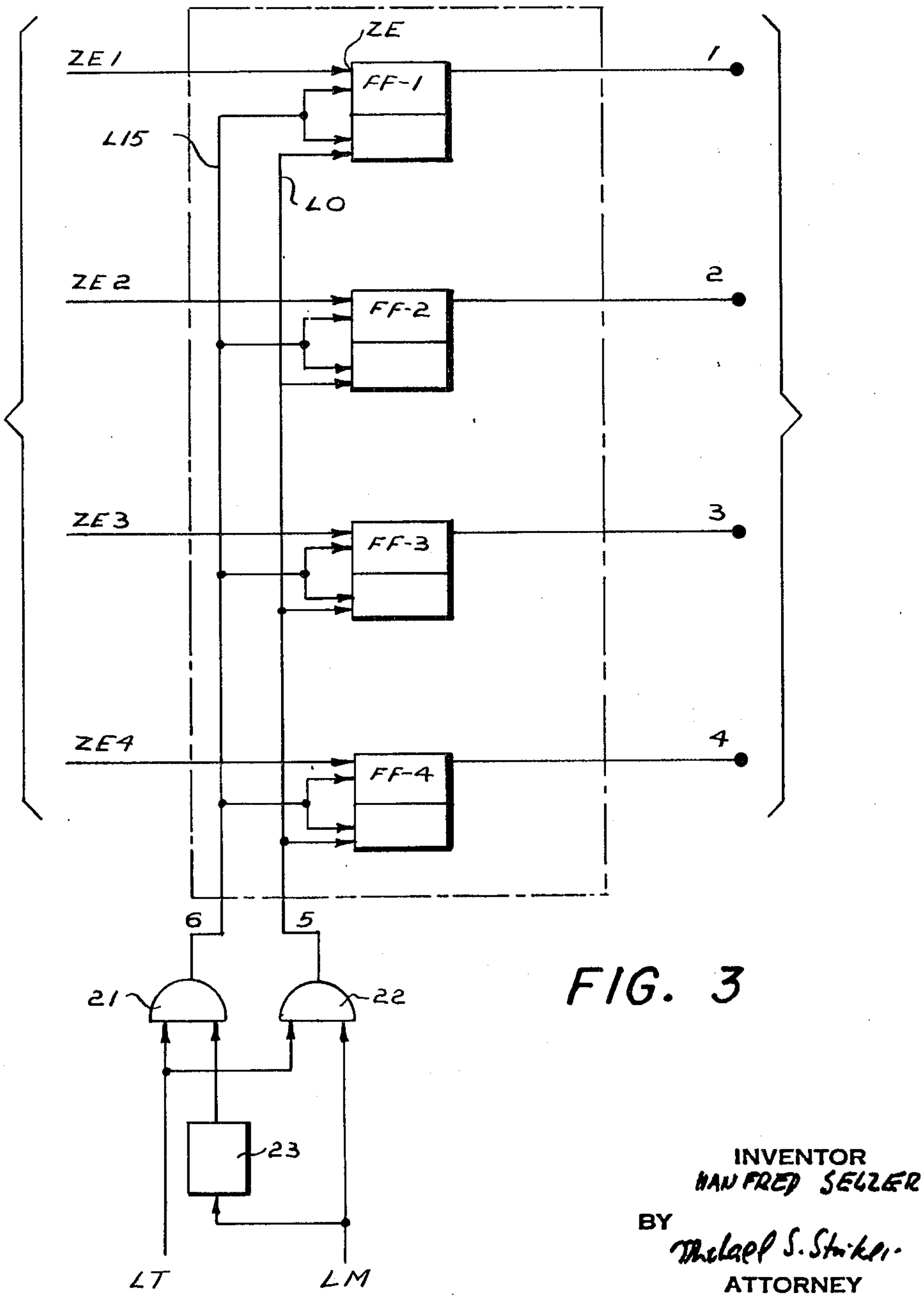
FIG. 3 shows an arrangement for flip-flops, each having a single output line and control circuitry for causing the complement of a number to appear on said output lines.

FIG. 3 shows an arrangement for flip-flops, FF—1, FF—2, FF—3, FF—4. Each of said flip-flops has an output line. These are numbered 1, 2, 3, and 4 respectively. Furthermore, each flip-flop has a set input respectively numbered ZE1, ZE2, ZE3, and ZE4, for receiving the given number whose complement is to be found. Further, each flip-flop has a trigger input, each of said trigger inputs being connected to line L15. A signal on said line L15 will cause all of said flip-flops to flip from one stable state to the other. Line LO furnishes the RESET signal and is connected to the RESET input of each of said flip-flops.

Line LO is connected to the output of first AND gate 22 which has a first input connected to a source of RESET signals LM and a second input connected to a source of trigger signals LT and a second input connected to an inverter 23 connected to said source of RESET signals LM.

The operation of this circuit will now be explained by means of a specific example. It will be assumed that the given number is furnished in the excess 3 code. For example it will be assumed that the number to be complemented is a 2. It will be assumed that the values assigned to the flip-flops 1, 2, 3 and 4 are, respectively, 1, 3, 4 and 8.

First, all flip-flops are reset by means of a signal appearing on line 5 and thus at reset lines LO. Next, the flip-flops are set to the number 2 in excess 8 code by means of the set inputs ZE1 through 4. Since 2+3=5 the state of the flip-flops will then be as follows:

Flip-flop 1—SET

Flip-flop 2—RESET
Flip-flop 3—SET
Flip-flop 4—RESET

A trigger signal is next applied to all of said flip-flops from the output of AND gate 21. This causes each flip-flop to assume the opposite state, thus resulting in the following flip-flop setting:

Flip-flop 1—RESET
Flip-flop 2—SET
Flip-flop 3—RESET
Flip-flop 4—SET

The number thus generated is 2+8=10. Since an excess 3 code is being used, this number 10 represents 10–3 or 7. It will be noted that the number 7 is the 9's complement of the number 2 originally entered into the flip-flops.

It may thus be noted that the arrangement according to this invention is of particular usefulness in computing arrangements wherein a combination of four binary stages is used to represent a decimal digit.

While the invention has been illustrated and described as embodied in a four-stage flip-flop arrangement representing a decimal digit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for furnishing the complement of a given number, comprising, in combination, a plurality of bistable elements each having a first and second stable state respectively indicating the presence and absence of a binary digit, each of said bistable elements having a set input, a reset input and a trigger input, signals at said set and reset inputs, respectively, causing said bistable elements to assume said first and second stable states, each signal applied at one of said trigger inputs causing the corresponding bistable element to switch from one stable state to another; a plurality of output lines, each connected to a corresponding bistable element in such a manner that a signal is furnished on said line when the bistable element is in said first stable state; means for applying a reset signal substantially simultaneously to the reset input of all of said bistable elements, said means comprising a first AND gate having a first input for receiving a reset signal, a second input for receiving a trigger signal, and a first AND gate output, and means for connecting said first AND gate output to all of said reset inputs of said plurality of bistable elements; means for applying a set signal to selected ones of said set inputs representing said given number; and means for applying a trigger signal to all of said trigger inputs after the application of said set signals, said means comprising a second AND gate, having a first input for receiving a trigger signal, a second input for receiving an inverted reset signal, and a second AND gate output, and means for connecting said second AND gate output to all of said trigger inputs of said bistable elements, whereby the signal on said output lines represent the complement of said given number.

2. An arrangement as set forth in claim 1 wherein said plurality of flip-flops equals four flip-flops, said four flip-flops constituting a binary representation of a decimal digit.

3. An arrangement as set forth in claim 1 wherein each of said bistable elements is a flip-flop.

4. An arrangement as set forth in claim 1, wherein said means for applying said set signals comprise means for applying said set signals to selected inputs corresponding to a representation of said given number in an excess 3 code; whereby said complement appearing on said output lines after application of said trigger signals represent the 9's complement of said given number.